United States Patent [19]

Wheeler et al.

[11] Patent Number: 5,118,720

[45] Date of Patent: Jun. 2, 1992

[54] METHOD FOR PRODUCING POLYURETHANE FOAM AND APPARATUS THEREFOR

[75] Inventors: Robert D. Wheeler, Fairfield; Ronald J. Wierzbicki, New Milford; Edward H. Schulman, Trumbull; George T. Bertram, Newtown, all of Conn.

[73] Assignee: Sealed Air Corporation, Bergen, N.J.

[21] Appl. No.: 731,115

[22] Filed: Jul. 15, 1991

Related U.S. Application Data

[62] Division of Ser. No. 297,497, Jan. 13, 1989, Pat. No. 5,055,272.

[51] Int. Cl.⁵ ............................................. C08G 18/14
[52] U.S. Cl. .................................... 521/99; 521/128; 521/130; 521/133
[58] Field of Search ................... 521/99, 128, 130, 133

[56] References Cited

U.S. PATENT DOCUMENTS

| | | | |
|---|---|---|---|
| 3,862,879 | 1/1975 | Baron et al. | 161/159 |
| 3,882,052 | 5/1975 | Raynor et al. | 260/2.5 |
| 3,981,649 | 9/1976 | Shimano et al. | 425/4 C |
| 3,989,869 | 11/1976 | Neumaier et al. | 428/254 |
| 4,043,715 | 8/1977 | Hendry | 425/4 R |
| 4,098,855 | 7/1978 | Fries | 264/50 |
| 4,157,427 | 6/1979 | Ferber | 521/133 |
| 4,275,172 | 6/1981 | Barth et al. | 521/112 |
| 4,312,820 | 1/1982 | Arnold et al. | 264/40.1 |
| 4,377,257 | 3/1983 | Geise | 239/419.3 |
| 4,436,679 | 3/1984 | Winstead | 264/40.3 |
| 4,674,888 | 6/1987 | Carlson | 366/337 |

FOREIGN PATENT DOCUMENTS

| | | |
|---|---|---|
| 1192719 | 9/1985 | Canada . |
| 0080643 | 8/1986 | European Pat. Off. . |
| 2628785 | 12/1977 | Fed. Rep. of Germany . |
| 2629609 | 1/1978 | Fed. Rep. of Germany . |
| 1087943 | 4/1964 | United Kingdom . |

Primary Examiner—Maurice J. Welsh
Attorney, Agent, or Firm—Bell, Seltzer, Park & Gibson

[57] ABSTRACT

A method of producing a polyurethane foam comprising the steps of dissolving rapidly and substantially completely a non-condensible non-reactive gas in a liquid isocyanate component or a liquid polyol component or both while the isocyanate and polyol components are maintained separate from one another, while controlling the flow of the non-reactive gas to maintain a predetermined dissolved gas to liquid ratio, and while maintaining the component in which the nucleating agent is being dissolved under pressure sufficient to maintain the gas in solution and to hold substantially constant the dissolved gas to liquid ratio and mixing the previously separated isocyanate and polyol components together while reducing the pressure to nucleate the dissolved gas in the isocyanate and polyol components and while impinging liquid streams of the composition together thereby enhancing mixing and permitting the mixture to foam so as to form a fine celled polyurethane foam. An apparatus for producing the same is also provided.

5 Claims, 1 Drawing Sheet

METHOD FOR PRODUCING POLYURETHANE FOAM AND APPARATUS THEREFOR

This application is a divisional application of co-pending prior application Ser. No. 07/297,497, filed with the U.S. Patent Office on Jan. 13, 1989, now U.S. Pat. No. 5,055,272.

FIELD AND BACKGROUND OF THE INVENTION

This invention relates to the production of polyurethane foam and more particularly to a method and apparatus for enhancing the mixing of the liquid polyurethane foam components resulting in a foam having a fine cell structure.

Various processes for producing polyurethane foam are known in the art. In general, a polyol component and a isocyanate component are reacted together in the presence of a catalyst, a surfactant and a chemical blowing agent such as a fluorocarbon or a chlorofluorocarbon (i.e. Freon®). Certain fluorocarbons and chlorofluorocarbons, however, have been determined to be pollutants of the atmosphere and thus the dependence thereon is undesirable.

An alternative to the use of these compounds has been suggested and comprises the mechanical induction into the polyol or isocyanate compounds of a gas such as air, carbon dioxide or nitrogen, which does not detrimentally effect the atmosphere. For example, U.S. Pat. No. 3,862,879 discloses a process wherein the gas and all of the urethane components, except for the catalyst, are fed into a mixer, the components are frothed, the catalyst is mixed with the froth and the froth is directed into a mold.

Another previously suggested alternative is to use a reaction injection molding (RIM) system wherein the polyurethane forming components are mixed by high pressure impingement of the components together and injection of the mixture into a heated mold. The foaming for the RIM system may be facilitated by entraining gas bubbles in the mixture to lower its viscosity such as described, for example, in U.S. Pat. No. 3,882,052 to Raynor et al or U.S. Pat. No. 4,157,427 to Ferber.

The limitations of existing processes and apparatus, however, are that it is difficult to obtain uniform mixing and a uniform cellular structure without utilizing complicated processes and cumbersome apparatus. Moreover, these processes and apparatus often result in products having an undesirable coarse cell structure and the time of reaction of the processes is too slow. These drawbacks are particularly a problem when making foam packaging materials and foam packaging cushions which require a fine cell structure in order to have optimum cushioning.

It is accordingly an object of this invention to provide an improved method and apparatus useful for producing polyurethane foams having a fine cell structure.

It is a feature of this invention to provide enhanced mixing of the reaction components of the polyurethane foam which results in the desired fine cell structure.

It is an advantage of this invention to eliminate the dependence on the use of fluorocarbons and chlorofluorocarbons by utilizing a non-condensible non-reactive gas.

SUMMARY OF THE INVENTION

These and other objects and advantages are achieved in the embodiments illustrated herein by the present invention which provides a method of producing a fine celled polyurethane foam. A non-condensible non-reactive gas is dissolved rapidly and substantially completely in a liquid isocyanate component or a liquid polyol component or both while these components are maintained apart from one another. The flow of the gas to the component is controlled to maintain a predetermined dissolved gas to liquid ratio. The component is also maintained under a pressure sufficient to maintain the gas in solution. The isocyanate and polyol components are then mixed together while reducing the pressure to nucleate the dissolved gas in the isocyanate and polyol components and while impinging liquid streams of the components together thereby enhancing mixing and permitting the mixture to foam so as to form a fine celled polyurethane foam.

The invention also provides an apparatus useful in providing the fine celled polyurethane foam. The apparatus includes a means for supplying a non-condensible non-reactive gas, means for supplying the liquid isocyanate and polyol components, a vessel for receiving one of the liquid isocyanate and polyol components from said component supply means, means for receiving one of the liquid components from said vessel and for receiving the non-condensible non-reactive gas from the gas supply means, the means for receiving including means for converting the gas to microbubbles which are substantially completely dissolved in the liquid isocyanate or polyol component, means for controlling the flow of gas to maintain a predetermined dissolved gas to liquid ratio and for producing a pressure sufficient to maintain the gas dissolved in the liquid components, and means operably associated with the means for receiving for mixing a stream of the liquid isocyanate and polyol components by impinging them together to form the polyurethane foam.

BRIEF DESCRIPTION OF THE DRAWINGS

The foregoing and other objects, features and advantages of the present invention will be made apparent from the following detailed description of the preferred embodiment of the invention, and from the drawings, in which.

DETAILED DESCRIPTION OF THE INVENTION

Figures 1, 2, 3:
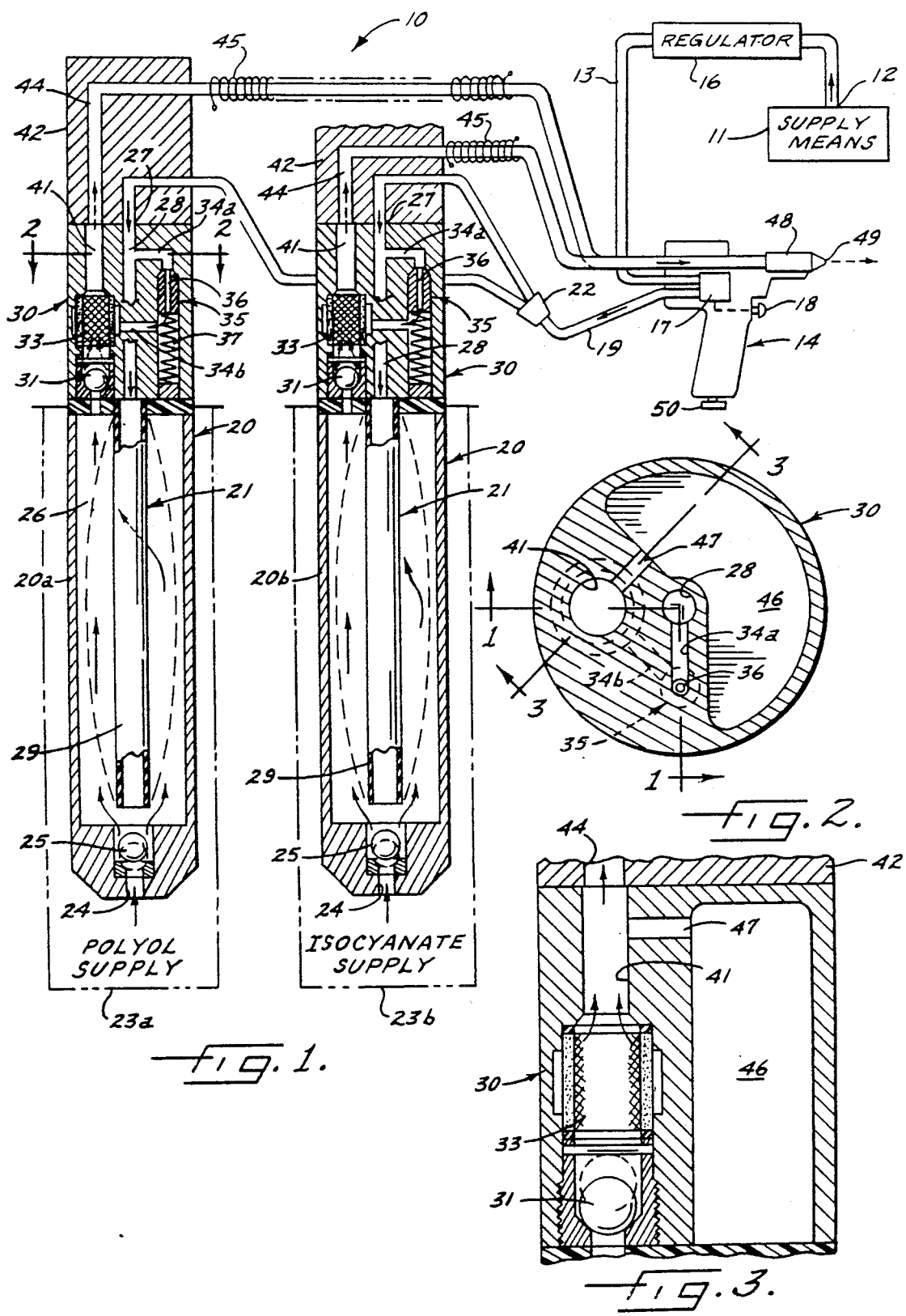
FIG. 1 is a diagrammatic and cross-sectional view of an apparatus suitable for the practice of the present invention.
FIG. 2 is a top sectional view of the apparatus taken along line 2—2 of FIG. 1.
FIG. 3 is a cross-sectional view of the vessel taken along line 3—3 of FIG. 2 and showing an accumulator not shown in FIG. 1.

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

The method and apparatus of the present invention is useful in forming polyurethane foam of varying compositions. The production of polyurethane foam is known and is typically produced by reacting together a liquid polyol component, a liquid organic isocyanate component, a surfactant, a blowing agent, a nucleating agent and a catalyst.

Suitable liquid polyol components may be any polyol compound or mixture thereof having from 2 to 8 active hydrogens. Exemplary polyols include the polyether polyols and polyester polyols. Suitable isocyanate components are those that react with polyols to form a urethane. Exemplary isocyanates include toluene diisocyanate ("TDI"), hexamethylene diisocyanate, methylene-bis(phenylisocyanate) ("MDI") and polyphenylene polymethylene isocyanate. The reaction catalyst may be any catalyst suitable for the purpose of reacting the polyol and isocyanate reaction components together and include tertiary amines such as N-methyl morpholine, triethylene diamine and triethylamine, and metallic salts such as stannous salts. Suitable surfactants include silicones and siloxane oxyalkylene block copolymers.

Now referring to the Figures, an apparatus for producing a fine celled polyurethane foam is shown and generally indicated at 10 (FIG. 1). The apparatus 10 generally includes a means 11 for supplying a non-condensible non-reactive gas, at least one vessel 20, means 30 for receiving one of the components and for receiving the non-reactive gas which includes means 33 for converting the non-reactive gas to microbubbles, means 21 for controlling the flow of gas to maintain the dissolved gas to liquid ratio and for producing a pressure sufficient to maintain the gas dissolved in the reaction components and means 14 operably associated with the reaction vessels for mixing the reaction components together.

Referring to FIG. 1, a non-condensible non-reactive gaseous nucleating agent is supplied under pressure from supply means 11 through a gas outlet 12 to a conduit 13. The supply means 11 preferably is a supply tank remote from the apparatus 10 where the gas is pumped to the means 14 for mixing and is controlled by a regulator 16. Bottled or tank gas having a regulator also may be used.

Suitable non-condensible non-reactive gaseous nucleating agents which are chemically inert with respect to the polyol and isocyanate components include air, carbon dioxide and nitrogen. Non-condensible gases are those that have an atmospheric boiling point below about −80° C. Additionally the gases may need to be in a dry form particularly when the gas is dissolved in the isocyanate component. In general these non-reactive gases are much less harmful to the environment than gases like chlorofluorocarbons used heretofore as nucleating agents.

The gas passes from the conduit 13 to a means 14 for mixing such as a mixing gun. The mixing gun 14 includes a control valve 17 activated by a trigger 18. When the valve 17 is opened, the non-reactive gas is fed into one or more vessels 20 via a vessel conduit 21 made of a resilient material such as rubber.

Preferably there is a separate vessel 20a for the polyol component and a separate vessel 20b for the isocyanate component with the non-nucleating gas being fed into either or both of the vessels 20a, 20b through Y-fitting 22. However, for discussion purposes the operation of only one of the reaction vessels will now be described noting that the vessels operate identically to each other.

A chemical component, namely the polyol component or the isocyanate component and any catalysts and surfactants therein, are drawn into the vessel from a supply source 23a, 23b through an inlet 24 and a vessel input ball valve 25. Preferably the vessel 20a includes a means 21 for controlling the flow of the non-reactive gas and for producing a pressure. An exemplary means 21 is a pneumatically operated bladder pump which may be operated using the non-reactive gas When the trigger 18 of the mixing gun is pulled, the non-reactive gas enters the vessel 20a at an inlet 27 and through a conduit 28 causing a bladder 29 of the bladder pump 21 to expand as illustrated by dotted lines in FIG. 1. The bladder 29 is hollow and is made from a resilient material such as rubber. The non-reactive gas enters the hollow portion of the bladder 29 causing the bladder to expand outwardly. During expansion of the bladder 29, the vessel input ball valve 25 is closed and a top ball valve 31 communicating with the means 30 for receiving one of the liquid components and for receiving the non-reactive gas is opened. The expansion of the bladder 29 forces the liquid component into the means 30 and the bladder pump 21 provides a means for producing pressure within the vessel 20a and within the means 30 and also controls the flow rate of the non-reactive gas.

Referring to FIGS. 2 and 3, the means 30 for receiving one of liquid components and for receiving the non-reactive gas includes means 33 for converting the non-reactive gas into microbubbles which are dissolved in the chemical components. The means 33 comprises a porous sparger element, and is preferably constructed of a sintered material such as sintered metal, plastic or ceramic material. The pores of the sparger element 33 are typically up to about 10 microns in diameter and are preferably about 0.5 microns and lower in diameter. Sintered materials are preferred because they provide high mechanical stability under the pressures that may be involved. Additionally these materials are inert to most chemical reactants and are also corrosion resistant.

The non-reactive gas which is used to expand the bladder 29 is also diverted into the means 33 through upper and lower conduits 34a and 34b and means 35 for restricting the flow of the non-reactive gas. Means 35 may include a check valve 36 and a spring 37 which biases the valve 36 to hold it in place. The non-reactive gas is rapidly and completely dissolved in the stream of chemical components flowing through the sparger element 33 with no surges of gas flow. The chemical components and the non-reactive gas dissolved therein are maintained under pressure to maintain the gas dissolved in the chemical components.

The bladder pump also controls the gas flow so as to maintain a predetermined dissolved gas to liquid ratio. The predetermined and preferred dissolved gas to liquid ratio is one wherein the percentage of gas is such that reaching the gas saturation point of the liquid component is avoided when under pressure. For example, if air is used as the nucleating agent, then the saturation point of the polyol component is about 21% by volume air and the saturation point of the isocyanate component is about 24% by volume air. The preferred percentage of dissolved gas is about 10% by volume air in either of the components. The operating pressure, also controlled by the bladder pump 21 and by the gas regulator 16, is from about 50 to 350 psi, and is preferably from about 70 to 110 psi.

The chemical components/dissolved gas mixture passes out of means 30 for receiving into an outlet chamber 41. The outlet chamber 41 communicates with a manifold 42 having a conduit 44, preferably having a heating element 45, which connects the vessel 20a or 20b to the mixing gun 14. This manifold 42 is a component of some foam-producing systems using chlorofluorocarbons, thus the means 30 can be easily retrofitted into existing systems by inserting it between the vessel 20a and the manifold 42.

The outlet chamber 41 also is connected to an accumulator 46 located in the means 30 through a channel 47 (FIGS. 2 and 3). The accumulator 46 facilitates maintaining pressure in the conduit 44 which without the accumulator 46 would drop to atmospheric pressure causing premature nucleation. Additionally, the accumulator 46 protects the sparger element 33 from pressure variations of the chemicals downstream of the means 30 caused by thermal expansion and contraction. The accumulator 46 also prevents backflow into the means 30.

The conduit 44 enters the mixing gun 14 and a mixing cartridge 48 wherein the pressure is rapidly reduced substantially simultaneously with the liquid components being impinged together. This rapid reduction of pressure causes the liquid component to become supersaturated and nucleation occurs resulting in the formation of a plurality of microbubbles. This rapid nucleation at the point of impingement enhances mixing of the components together. This mixture exits the mixing gun 14 through an opening 49 and is directed outward to form a foam packaging material or is directed to an open mold to form an article of manufacture such as a foam packaging cushion.

After the trigger 18 is released, the non-reactive gas is released through vent 50 in the bottom of the mixing gun 14. The bladder 29 collapses opening the input ball valve 25 and closing the top ball valve 31 and chemical is drawn into the vessel 26 from the supply means 23a, 23b and the system is ready again.

Thus enhanced mixing and a fine celled polyurethane foam may be obtained by rapidly and substantially completely dissolving a non-condensible gaseous nucleating agent in one or both of the chemical components, controlling the flow of the non-reactive gas to maintain the dissolved gas to liquid ratio, maintaining the gas in solution by maintaining the pressure, followed by reducing the pressure to nucleate the gas in the components while mixing the components together by impinging the liquid streams together.

That which we claimed is:

1. A method of producing a polyurethane foam having a fine cell structure from a mixture of a liquid isocyanate compound and a liquid polyol component, said method comprising the steps of:

dissolving rapidly and substantially completely a non-condensible non-reactive gas in a liquid isocyanate component or a liquid polyol component or both while the isocyanate and polyol components are maintained separate from one another, while controlling the flow of the non-reactive gas to maintain a predetermined dissolved gas to liquid ratio and while maintaining the component in which the gas is being dissolved under pressure sufficient to maintain the gas in solution, and mixing the previously separated isocyanate and polyol components together while reducing the pressure to nucleate the dissolved gas in the isocyanate and polyol components and while impinging liquid streams of the components together thereby enhancing mixing and permitting the mixture to foam so as to form a fine celled polyurethane foam.

2. A method according to claim 1 wherein said step of rapidly and substantially completely dissolving the non-condensible non-reactive gas includes forming microbubbles of the non-reactive gas by passing the gas through a porous structure.

3. A method according to claim 1 wherein the non-condensible non-reactive gas is selected from the group consisting of air, carbon dioxide and nitrogen.

4. A method according to claim 1 wherein the maintained pressure is from about 50 to 350 psi.

5. A method according to claim 4 wherein the maintained pressure is from about 70 to 110 psi.

* * * * *